(12) United States Patent
Benavides

(10) Patent No.: US 12,444,325 B1
(45) Date of Patent: Oct. 14, 2025

(54) NAME BADGE SYSTEM

(71) Applicant: Rachel Benavides, Attleboro, MA (US)

(72) Inventor: Rachel Benavides, Attleboro, MA (US)

(73) Assignee: Reeves Company, Inc., Attleboro, MA (US)

( * ) Notice: Subject to any disclaimer, the term of this patent is extended or adjusted under 35 U.S.C. 154(b) by 181 days.

(21) Appl. No.: 18/237,179

(22) Filed: Aug. 23, 2023

(51) Int. Cl.
*G09F 3/20* (2006.01)
*G06K 19/07* (2006.01)
*G09F 3/02* (2006.01)

(52) U.S. Cl.
CPC .......... *G09F 3/207* (2013.01); *G06K 19/0723* (2013.01); *G09F 3/02* (2013.01); *G09F 2003/0208* (2013.01); *G09F 2003/0279* (2013.01); *G09F 2003/0282* (2013.01)

(58) Field of Classification Search
CPC ............... G09F 3/02; G09F 2003/0279; G09F 2003/0282; G09F 3/207; G09F 2003/0208; A44C 3/001; G06K 19/0723
USPC ..................................... 40/1.5, 1.6
See application file for complete search history.

(56) References Cited

U.S. PATENT DOCUMENTS

| | | | | |
|---|---|---|---|---|
| 5,191,682 | A * | 3/1993 | Davis-Reardon | A44C 3/001 24/304 |
| 5,640,742 | A * | 6/1997 | White | A44C 3/001 24/3.12 |
| 6,520,544 | B1 * | 2/2003 | Mitchell | B65D 25/205 283/67 |
| 6,648,232 | B1 * | 11/2003 | Emmert | G06K 19/041 235/492 |
| 6,809,646 | B1 * | 10/2004 | Lee | G07C 9/28 235/487 |
| 6,957,777 | B1 * | 10/2005 | Huang | G06K 19/07724 235/487 |
| 7,096,278 | B2 | 8/2006 | Fraser | |
| 7,777,628 | B2 * | 8/2010 | Tilson, Jr. | B28B 23/00 340/572.1 |
| 9,785,879 | B1 | 10/2017 | Lauria et al. | |
| 10,490,045 | B2 | 11/2019 | Forster | |
| 11,408,965 | B2 | 8/2022 | Hewett et al. | |
| 2005/0024183 | A1 * | 2/2005 | Carter | G06K 19/07749 340/5.61 |
| 2006/0267762 | A1 * | 11/2006 | Jedlicka | G08B 21/0275 340/572.1 |
| 2009/0242647 | A1 * | 10/2009 | Kim | G06K 19/07749 235/492 |
| 2013/0247431 | A1 * | 9/2013 | Peterson | G09F 3/207 40/1.6 |

OTHER PUBLICATIONS

"Vulcan RFID Custom Credential Tag," atlasRFIDstore, https://www.atlasrfidstore.com/vulcan-rfid-custom-credential-tag/#short-description-id.

* cited by examiner

*Primary Examiner* — Cassandra Davis
(74) *Attorney, Agent, or Firm* — Salter & Michaelson

(57) ABSTRACT

A name badge that includes a badge base having a front surface that has adjacent areas including a first area for representing a person's name in printed letters, and a second area for supporting an RFID chip. The badge base also has a rear surface, a foam backing layer that covers the rear surface of the badge base and the RFID chip, and a rear support structure that enables the name badge to be supported at the rear surface and from a garment worn by a user.

15 Claims, 9 Drawing Sheets

NAME BADGE SYSTEM

TECHNICAL FIELD

The present invention relates, in general, to a name badge, more particularly, the present invention relates to a name badge that combines RFID technology with the name identification.

BACKGROUND OF THE INVENTION

Existing name badges typically only display the person's name and perhaps an affiliated company name. An object of the present invention is to provide an improved name badge that combines RFID technology with the characteristics of identification per the name badge. Another object of the present invention is to provide a lightweight name badge secured to a person's garments for providing both visual and digital credentials. Still another object of the present invention is to provide a badge system which provides added functionality, convenience, and safety when within a predetermined range of designated readers.

SUMMARY OF THE INVENTION

To accomplish the foregoing and other objects of the present invention there is provided a name badge that is comprised of a badge base having a front surface that has adjacent areas including a first area for representing a person's name in printed indicia, and a second area for supporting an RFID chip. The badge base also has a rear surface, and further including a rear support structure that enables the name badge to be supported at the rear surface and from a garment worn by a user.

In accordance with other aspects pf the present invention the printed indicia comprises printed letters that represent the person's name; further including a transparent window that is mounted at the second area of the badge base; the badge base has a through opening for receiving the transparent window; the transparent window is constructed of a clear plastic material; the transparent window has an outer lip that engages with an edge that defines the through opening; the rear support structure is comprised of one of a set of butterfly backings, a pin clip backing, and a pocket clip; and further including a backing layer that is disposed over the rear surface of the badge base.

In accordance with another version of the present invention there is provided a name badge that is comprised of a badge base having a front surface that has adjacent areas including a first area for representing a person's name in printed letters, and a second area for supporting an RFID chip. The badge base also has a rear surface, and a foam backing layer that covers the rear surface of the badge base and the RFID chip, and a rear support structure that enables the name badge to be supported at the rear surface and from a garment worn by a user.

In accordance with other aspects pf the present invention further including a transparent window that is mounted at the second area of the badge base; the badge base has a through opening for receiving the transparent window; the transparent window is constructed of a clear plastic material; the transparent window has an outer lip that engages with an edge that defines the through opening; and wherein the rear support structure is comprised of one of a set of butterfly backings, a pin clip backing, and a pocket clip.

In accordance with still another version of the present invention there is provided a method of constructing a name badge comprising the steps of providing a badge base having a front surface that has adjacent areas including a first area for representing a person's name in printed indicia, and a second area for supporting an RFID chip, providing the badge base having a rear surface, and further providing a rear support structure that enables the name badge to be supported at the rear surface and from a garment worn by a user.

In accordance with other aspects pf the present invention further including providing the printed indicia as printed letters that represent the person's name; providing a transparent window that is mounted at the second area of the badge base and providing the badge base with a through opening for receiving the transparent window; wherein the transparent window is constructed of a clear plastic material; wherein the transparent window has an outer lip that engages with an edge that defines the through opening, and providing a backing layer that is disposed over the rear surface of the badge base; and wherein the rear support structure is comprised of one of a set of butterfly backings, a pin clip backing, and a pocket clip.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION

In accordance with the present invention the system is the ideal vehicle to combine RFID technology with the visual identification method of name badges. This provides added functionality, convenience, and safety when within a predetermined range of designated readers. The system is unique in that the RFID chip is either visible on the name badge or disguised on the name badge behind a logo. The novel badge construction is preferably in the form of a lightweight name badge secured to a person's garments providing both visual and digital credentials.

The following are uses of the system:

Access Control—RFID chips in name badges grant access to restricted areas. Access can be enabled or disabled instantly, eliminating the need to have access keys returned by the employee.

Time and Attendance Tracking—Tracks employees' attendance and working hours by placing RFID readers at entry and exit points.

Cashless Payments—Enables cashless payments at events or within a workplace, eliminating the need for physical cash, cards, and handheld devices.

Asset Tracking—It can be used as a visual labeling tool and RFID tracker on valuable assets, pets and livestock.

Personalized Experiences—It enables personalized experiences at tourist attractions/tours, events, and conferences. By linking the badge to an attendee's profile, event organizers can customize interactions such as personalized greetings, tailored recommendations, or targeted marketing messages.

Security and Identification—It can enhance security by enabling both visual and digital identification of individuals that is quick and accurate. The digital profile can store important credentials and be matched with a person's name, title, and/or other credentials displayed on the system. These methods make it easier to verify identities and prevent unauthorized access.

Strategic Planning—The system uses can be applied in strategic planning for housekeeping in hotels, dining room guest experiences, building tours, and crowd control.

Figure 1:
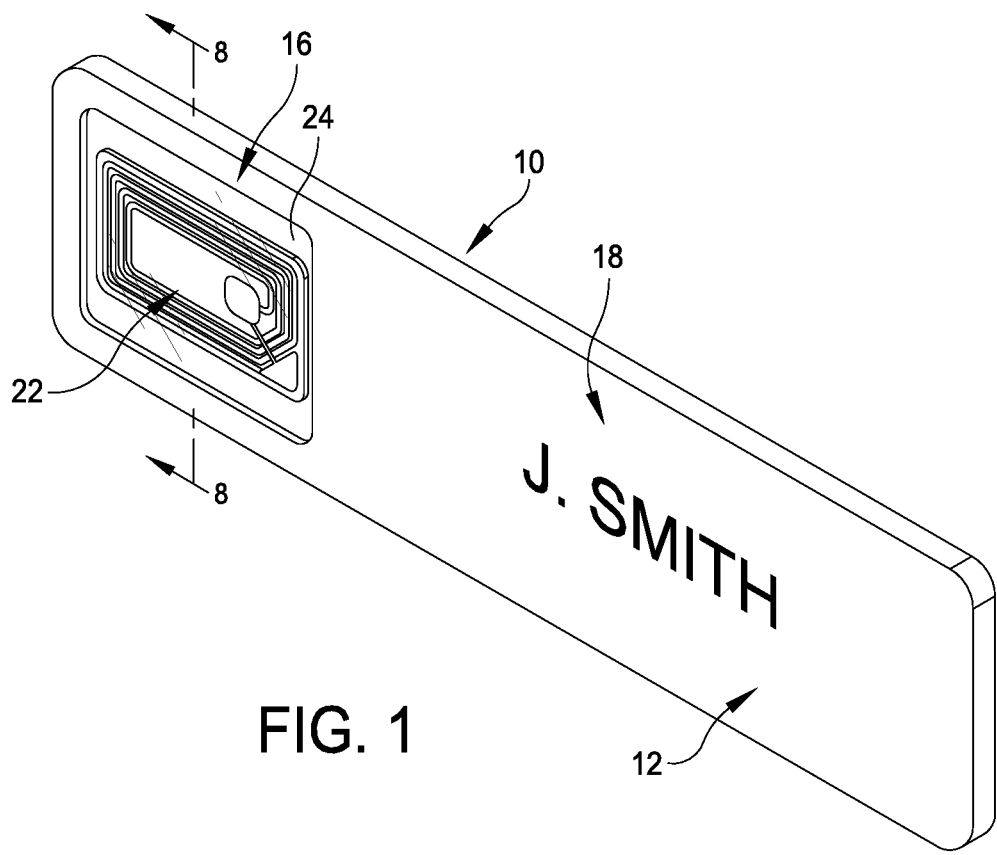
FIG. 1 is a front perspective view of the name tag.
Figure 2:
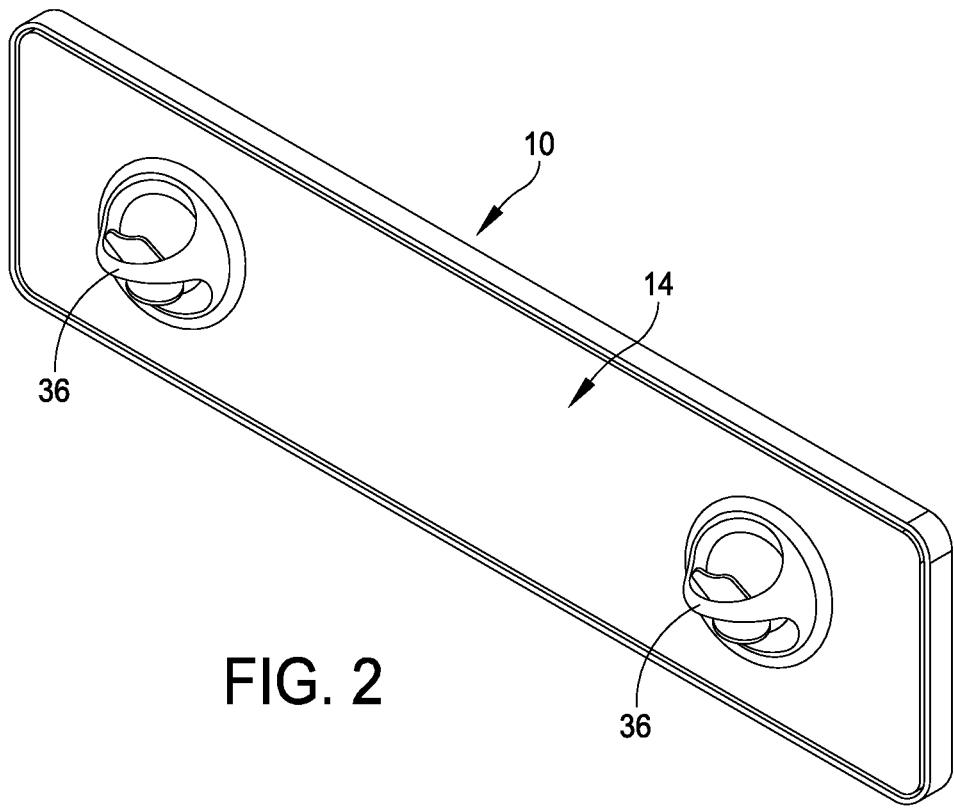
FIG. 2 is a rear perspective view of the name tag.
Figure 3:
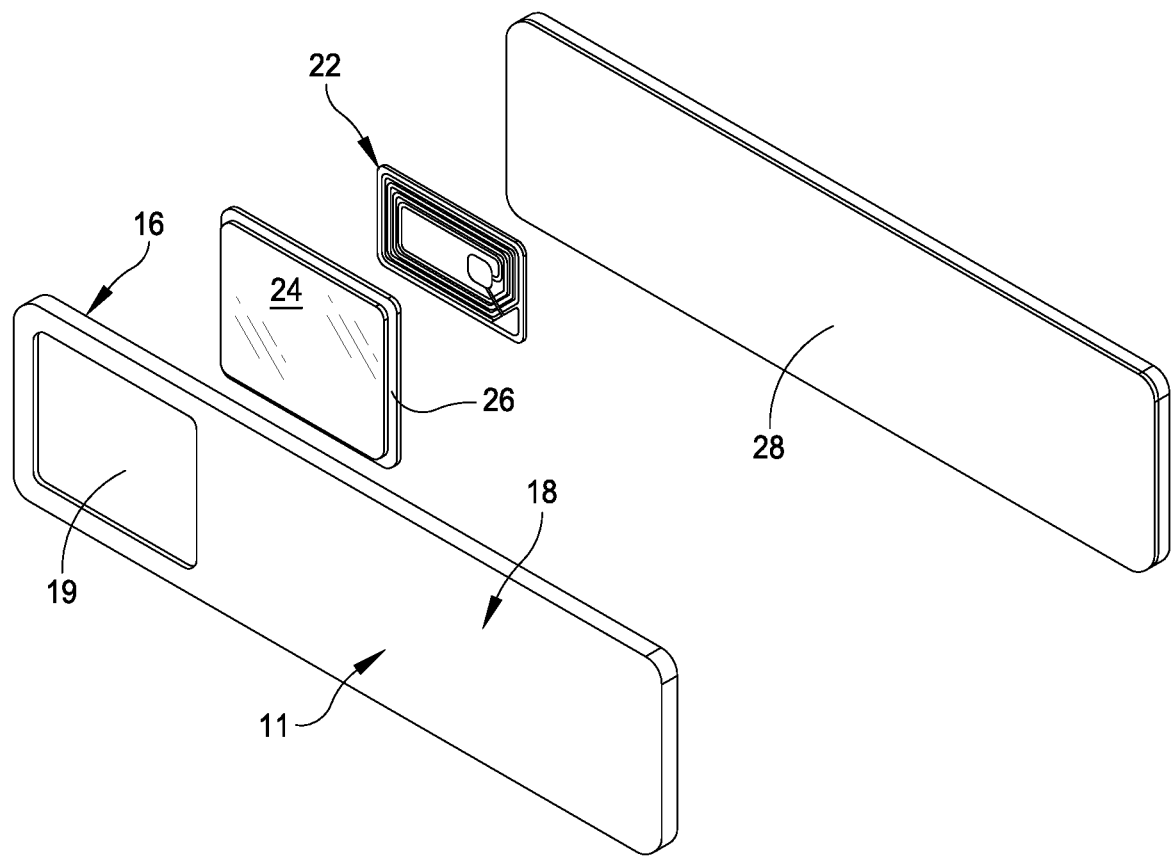
FIG. 3 is an exploded perspective view illustrating the basic components.
Figure 7:
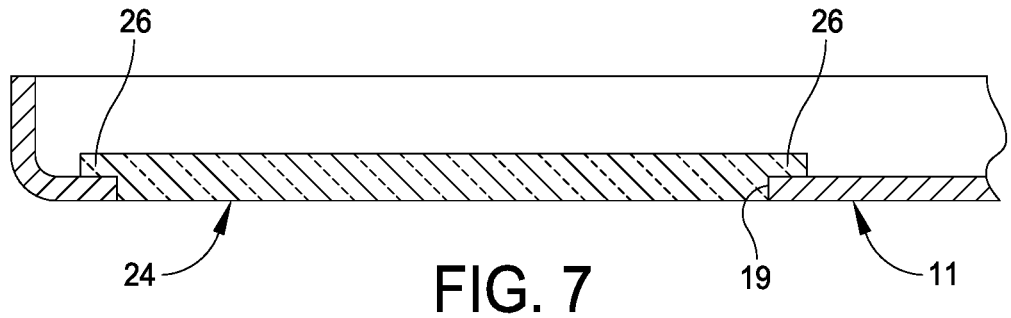
FIG. 7 is a cross-sectional view taken along line 7-7 of FIG. 6.

Reference is now made to the drawings for an illustration of several different embodiments of the present invention all of which embody the combination of RFID technology and a name badge. The drawings illustrate a name badge at 10 that is comprised of a badge base 11 that has adjacent areas including a first area 18 representing a person's name and printed indicia, and a second area 16 at which the RFID chip 22 is supported. FIG. 1 is a front perspective view that shows a badge front surface 12. FIG. 2 is a rear perspective view that illustrates the badge rear surface 14. In FIG. 2 there are provided a pair of butterfly backings 36 that enable the attachment of the back surface to a garment. In this regard refer to the cross-sectional view of FIGS. 7 and 8 that show the butterfly backing 36 engaged with the pin 37.

The badge base 11 also has a rear surface and further includes a rear support structure 32 that enables the name badge to be supported at its rear surface from a garment worn by a user.

Figure 12:
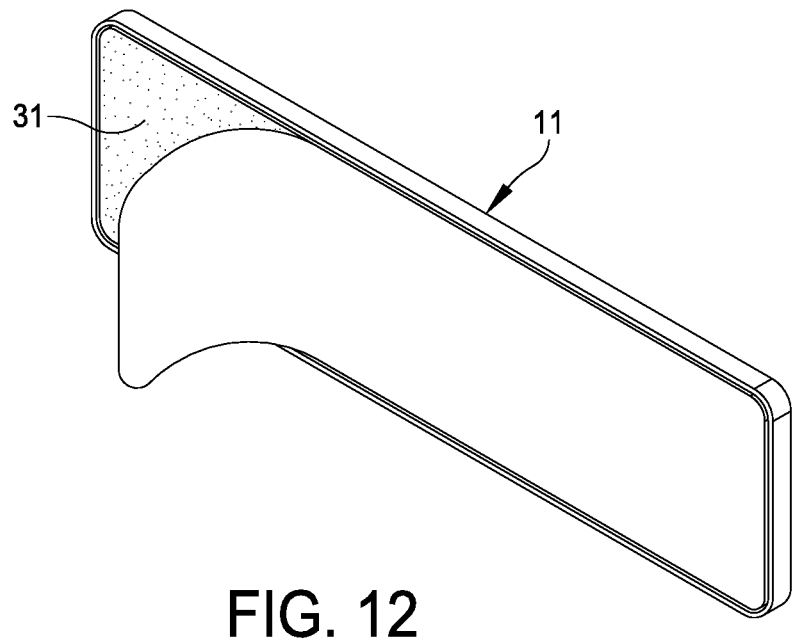
FIG. 12 illustrates a strip that can be removed to show an adhesive used on the back surface of the badge.
Figure 13:
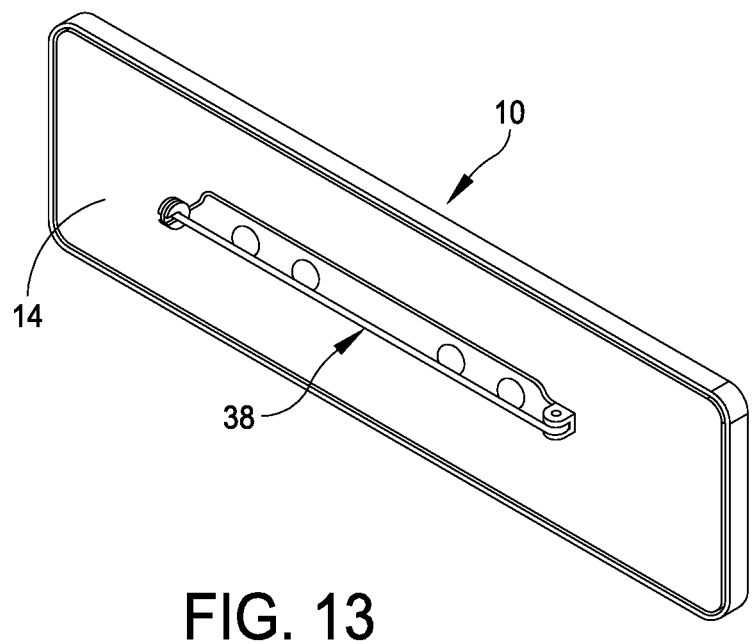
FIG. 13 illustrates a pair of pin clips that may be attached to the adhesive.

In accordance with further aspects of the present invention, the printed indicia may comprise printed letters that represent a person's name and/or an affiliated company. Reference may now be made to FIGS. 3-6 which include a series of perspective views showing the various components. There is provided a transparent window 24 that is mounted at the second area 18 of the badge base 11. The badge base 11 has a through opening 19 for receiving the transparent window 24. The transparent window preferably has an outer lip 26 that engages with an edge of the opening 19. In the first illustrated embodiment, the rear support structure 32 is comprised of a set of butterfly backings 36. In later embodiments other support structures are employed. For example, FIG. 13 illustrates a pin clip backing. In FIG. 12 there is a strip that is removed to expose an adhesive 31 at the rear of the badge base. The pin clip 38 may be secured to that adhesive.

Figure 4:
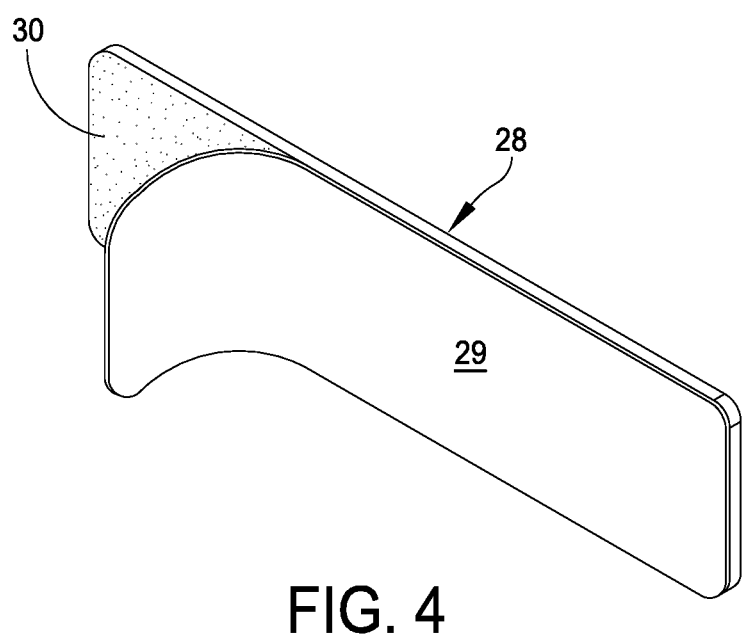
FIG. 4 is a perspective view of the foam backing illustrating the removal of a strip to show the adhesive.
Figure 5:
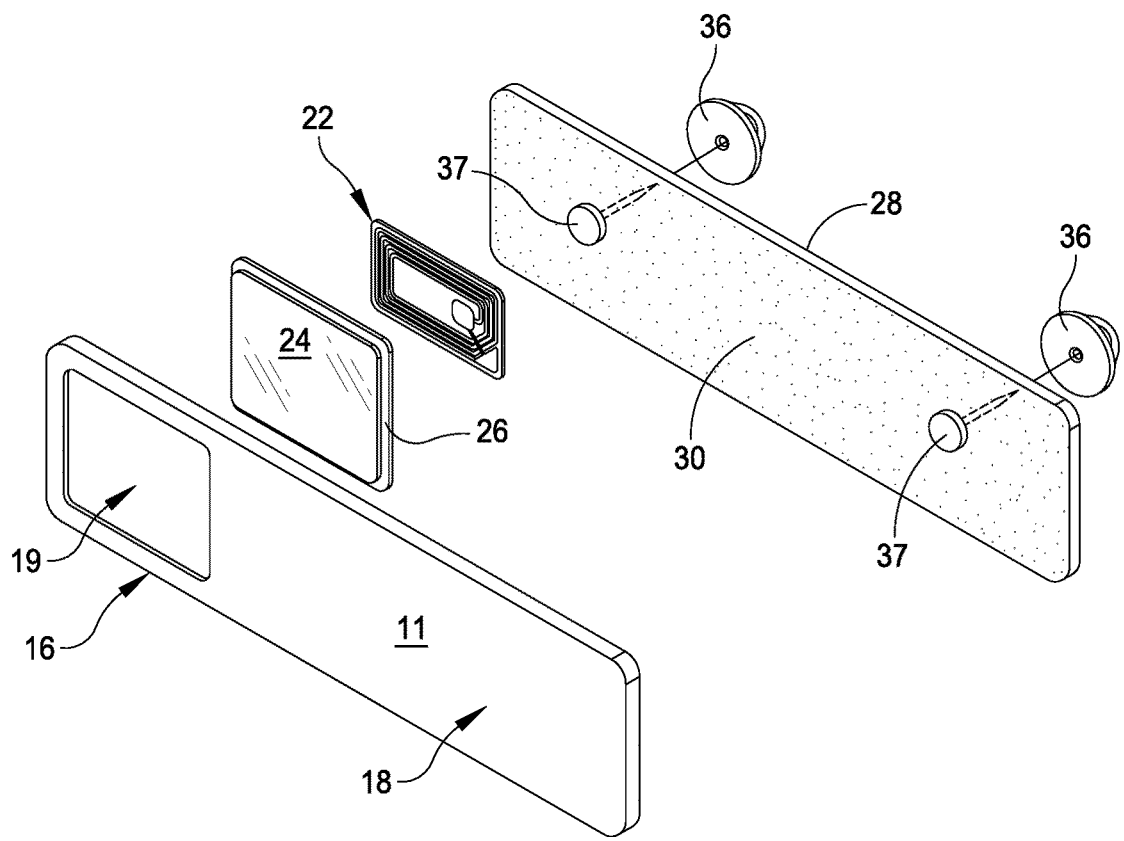
FIG. 5 is an exploded perspective view similar to that illustrated in FIG. 3 but showing the adhesive and the addition of a pair of military backings.
Figure 6:
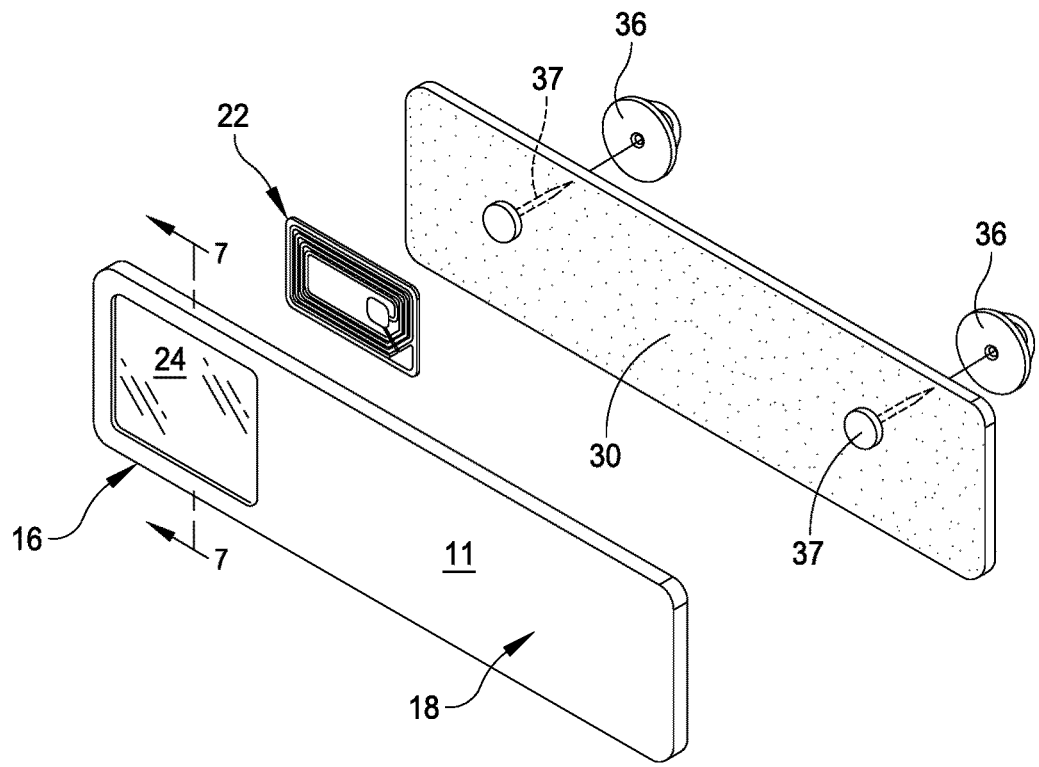
FIG. 6 is a perspective view illustrating the transparent window in place.
Figure 8:
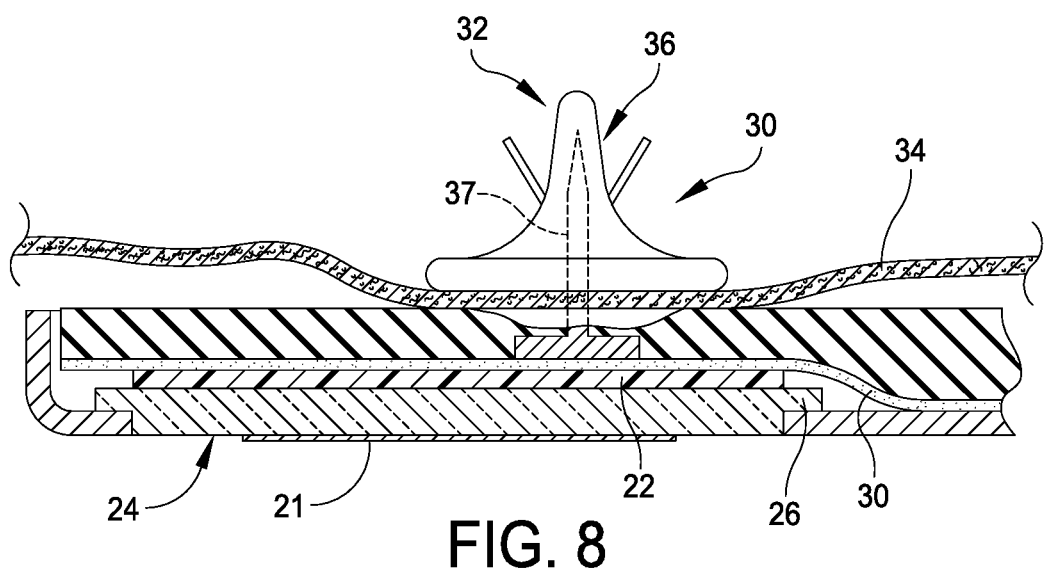
FIG. 8 is a cross-sectional view of the entire assembly.
Figure 14:
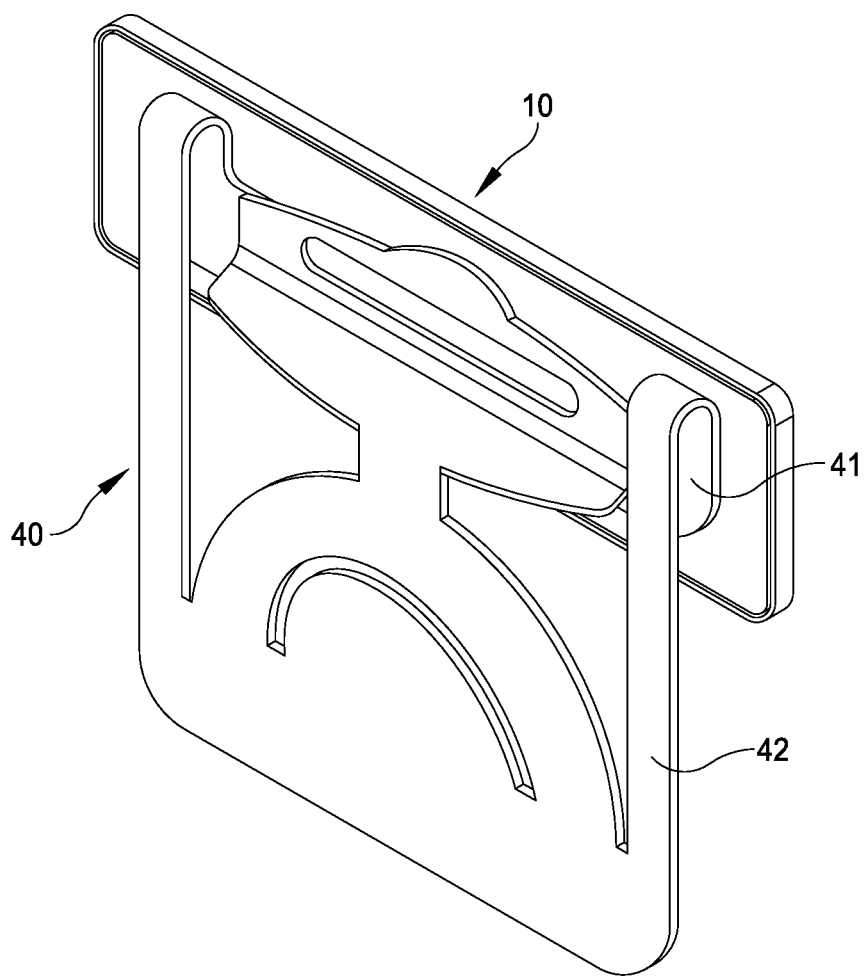
FIG. 14 is a perspective view showing another form of supporting the badge as a pocket clip.

In still another embodiment of the present invention illustrated in FIG. 14, for the support of at the rear of the badge base there is provided a pocket clip 40. The pocket clip 40 is comprised of separate legs 41 and 42. The elongated leg 42 would be meant to be disposed within a person's pocket so that the name badge can be readily displayed. The cross-sectional view of FIG. 8 in particular depicts the arrangement of all of the different components that are employed. FIG. 8 displays the transparent window at 24 and a logo at 21. The badge base is supported from the garment 34 by means of the butterfly backings 36. The back of the badge structure is formed by the foam backing layer 28. Refer to the perspective view of FIG. 4 where the foam layer 28 is illustrated. FIG. 4 also illustrates the foam backing layer adhesive at 30 and the removal strip at 29. FIG. 8 illustrates the foam backing layer adhesive at 30.

Figure 9:
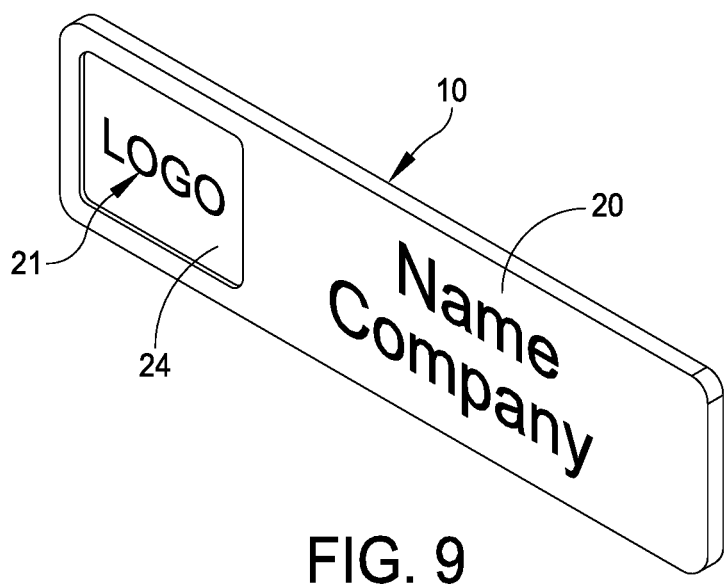
FIG. 9 is a perspective view of an alternate embodiment in which a logo is shown over the transparent window.

FIG. 9 is a perspective view that illustrates the first and second areas of the front surface of the badge. At the first area there may be displayed either the name or name and company of the user. At the second area there is provide the transparent window 24 and a logo at 21.

Figure 10:
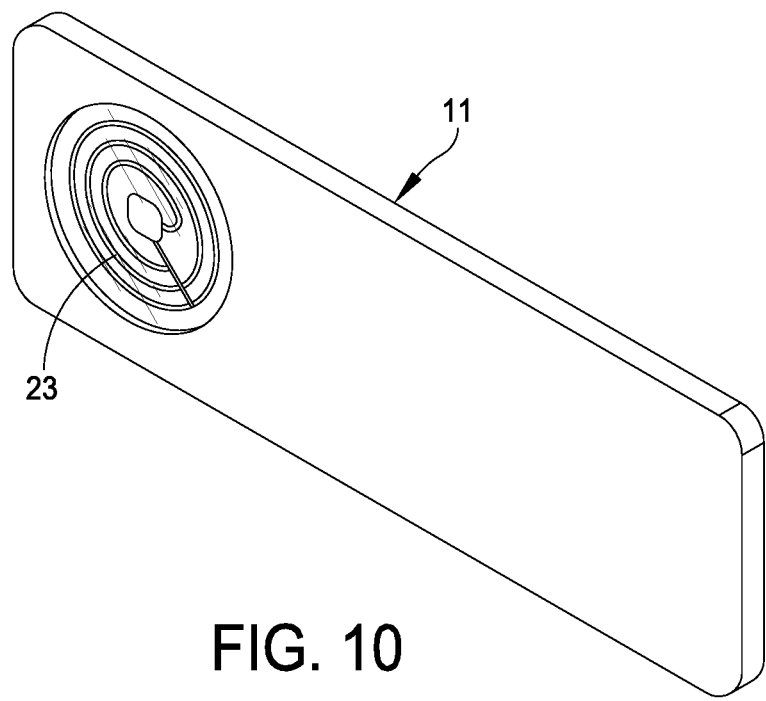
FIG. 10 illustrates an alternate embodiment in which a circular RFID chip is employed.
Figure 11:
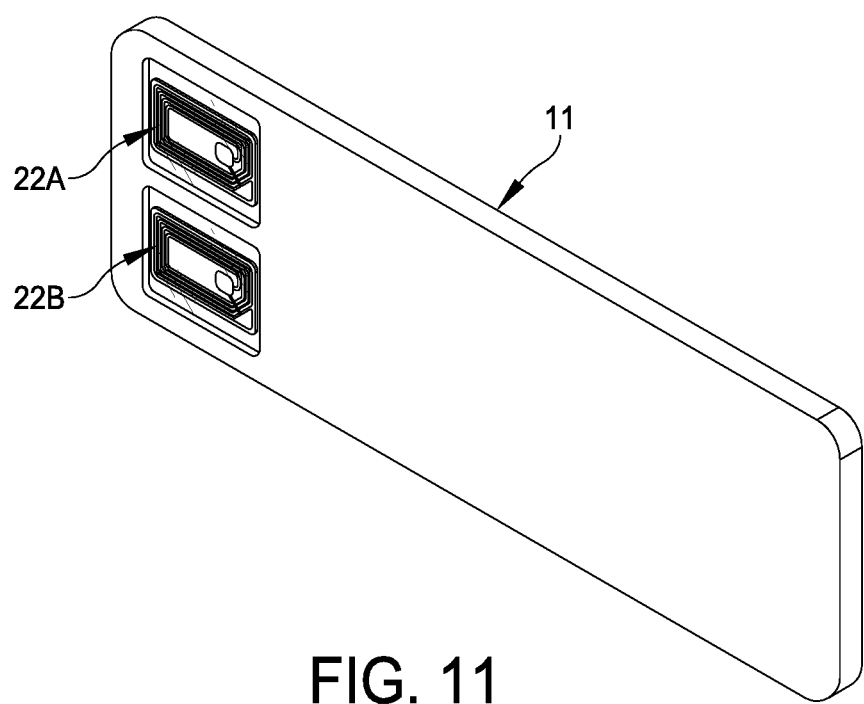
FIG. 11 is a perspective showing another embodiment of the present invention employing a pair of smaller RFID chips.

FIG. 10 shows an alternate embodiment of the present invention in which in place of a rectangular RFID chip, there is provided a round or circular RFID chip shown at 23. FIG. 11 illustrates the single RFID chip being replaced by a pair of smaller RFID smaller chips at 22A, 22B.

Figure 15:
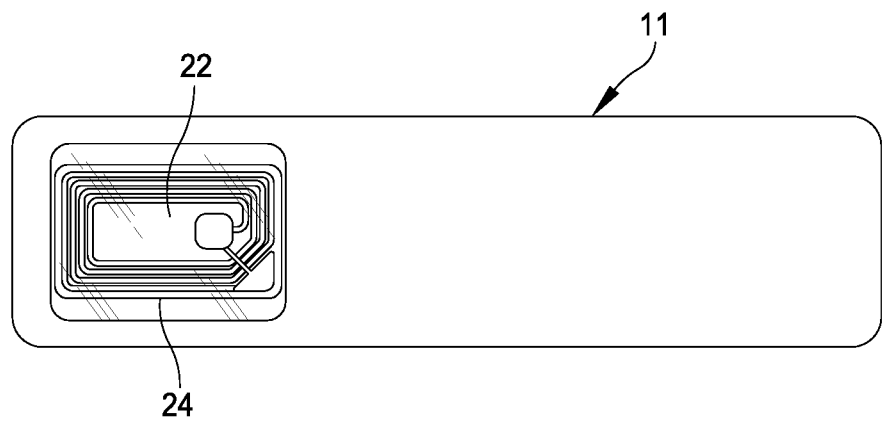
FIG. 15 is a front view of the badge.
Figure 16:
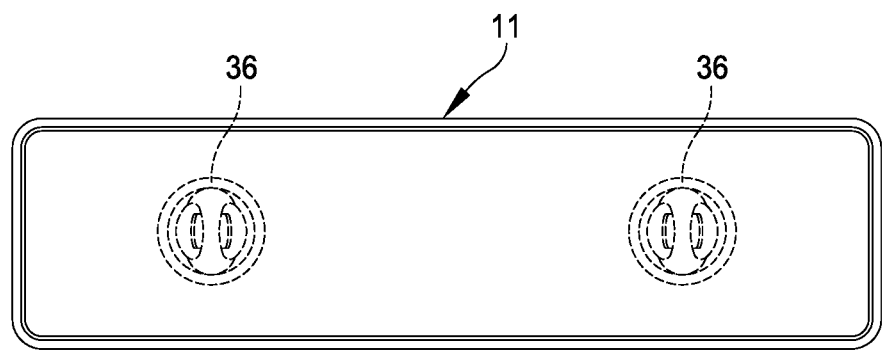
FIG. 16 is a rear view of the badge.
Figure 17:
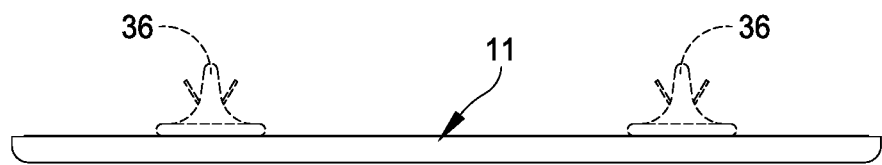
FIG. 17 is a top view of the badge.
Figure 18:
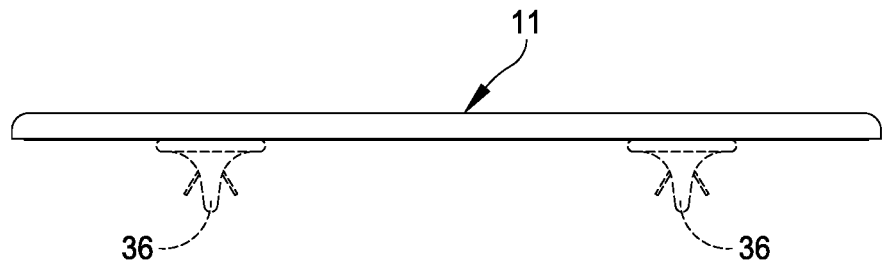
FIG. 18 is a bottom view of the badge.
Figure 19:
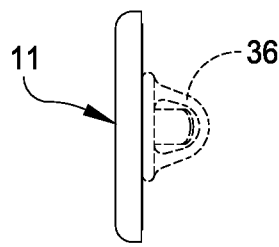
FIG. 19 is a left side view of the badge.
Figure 20:
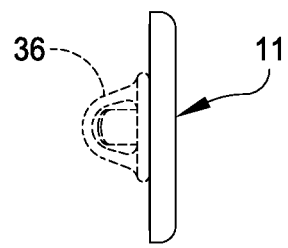
FIG. 20 is a right side view of the badge.

FIG. 15 is a front view of the badge. FIG. 16 is a rear view of the badge. FIG. 17 is a top view of the badge. FIG. 18 is a bottom view of the badge. FIG. 19 is a left side view of the badge. FIG. 20 is a right side view of the badge.

| Reference Number List | |
|---|---|
| name badge | 10 |
| badge base | 11 |
| badge front surface | 12 |
| badge rear surface | 14 |
| badge front surface first area | 18 |
| badge front surface second area | 16 |
| opening of front surface second area | 19 |
| person's name | 20 |
| Logo | 21 |
| RFID chip | 22 |
| Pair of RFID chips | 22A, 22B |
| Round RFID chip | 23 |
| transparent window | 24 |
| transparent window lip | 26 |
| foam backing layer | 28 |
| foam backing layer strip | 29 |
| foam backing layer adhesive | 30 |
| rear adhesive layer | 31 |
| rear support structure | 32 |
| garment layer | 34 |
| butterfly backings | 36 |
| backing pin | 37 |
| pin clip backing | 38 |
| a pocket clip | 40 |
| clip legs | 41, 42 |

Having now described a limited number of embodiments of the present invention, it should now be apparent to those skilled in the art that numerous other embodiments and modifications thereof are contemplated as falling within the scope of the present invention, as defined by the appended claims. For example, the badge base may be constructed of a number of different materials including plastic or metal materials. In one embodiment there is provided a metal name badge with an embedded RFID chip that is either exposed or covered with the depicted logo. The metal name badge is selected in particular so that it does not interfere with the RFID signal.

What is claimed is:

1. A name badge that is comprised of a badge base having a front surface that has adjacent areas including a first area for representing a person's name in printed indicia, and a second area for supporting and including an RFID chip, said badge base also having a rear surface, and further including a rear support structure that enables the name badge to be supported at the rear surface and from a garment worn by a user, further including a transparent window that is mounted at the second area of the badge base and wherein the badge base has a through opening for receiving the transparent window.

2. The name badge of claim 1 wherein the printed indicia comprises printed letters that represent the person's name.

3. The name badge of claim 1 wherein the transparent window is constructed of a clear plastic material.

4. The name badge of claim 3 wherein the transparent window has an outer lip that engages with an edge that defines the through opening; and a logo indicia on an exposed surface of the transparent window.

5. The name badge of claim 1 wherein the rear support structure is comprised of one of a set of butterfly backings, a pin clip backing, and a pocket clip.

6. The name badge of claim 5 further including a backing layer that is disposed over the rear surface of the badge base.

7. A name badge that is comprised of a badge base having a front surface that has adjacent areas including a first area for representing a person's name in printed letters, and a second area for supporting and including an RFID chip, said badge base also having a rear surface, a foam backing layer that covers the rear surface of the badge base and the RFID chip, and a rear support structure that enables the name badge to be supported at the rear surface and from a garment worn by a user, further including a transparent window that is mounted at the second area of the badge base, and wherein the badge base has a through opening for receiving the transparent window.

8. The name badge of claim 7 wherein the transparent window is constructed of a clear plastic material.

9. The name badge of claim 8 wherein the transparent window has an outer lip that engages with an edge that defines the through opening; and a logo indicia on an exposed surface of the transparent window.

10. The name badge of claim 7 wherein the rear support structure is comprised of one of a set of butterfly backings, a pin clip backing, and a pocket clip.

11. A method of constructing a name badge comprising the steps of providing a badge base having a front surface that has adjacent areas including a first area for representing a person's name in printed indicia, and a second area for supporting and including an RFID chip, providing the badge base having a rear surface, and further providing a rear support structure that enables the name badge to be supported at the rear surface and from a garment worn by a user, and further providing a transparent window that is mounted at the second area of the badge base and providing the badge base with a through opening for receiving the transparent window.

12. The method of claim 11 wherein the printed indicia comprises printed letters that represent the person's name.

13. The method of claim 11 wherein the transparent window is constructed of a clear plastic material.

14. The method of claim 13 wherein the transparent window has an outer lip that engages with an edge that defines the through opening, and providing a backing layer that is disposed over the rear surface of the badge base.

15. The method of claim 11 wherein the rear support structure is comprised of one of a set of butterfly backings, a pin clip backing, and a pocket clip.

* * * * *